United States Patent
Aikawa

(10) Patent No.: US 12,504,706 B2
(45) Date of Patent: Dec. 23, 2025

(54) VOLTAGE SUPPLYING DEVICE, DEVELOPER RECOVERY DEVICE, AND IMAGE FORMING APPARATUS

(71) Applicant: KYOCERA Document Solutions Inc., Osaka (JP)

(72) Inventor: Yukihiro Aikawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/905,917

(22) Filed: Oct. 3, 2024

(65) Prior Publication Data

US 2025/0189916 A1    Jun. 12, 2025

(30) Foreign Application Priority Data

Dec. 6, 2023 (JP) ................ 2023-205891

(51) Int. Cl.
| | |
|---|---|
| G03G 15/00 | (2006.01) |
| G03G 15/16 | (2006.01) |
| G03G 21/00 | (2006.01) |
| H02M 1/00 | (2007.01) |
| H02M 7/04 | (2006.01) |

(52) U.S. Cl.
CPC ....... *G03G 15/5004* (2013.01); *G03G 15/161* (2013.01); *G03G 15/80* (2013.01); *G03G 21/0064* (2013.01); *H02M 1/0003* (2021.05); *H02M 1/0025* (2021.05); *H02M 7/04* (2013.01)

(58) Field of Classification Search
CPC .. G03G 15/161; G03G 15/5004; G03G 15/80; G03G 21/0058; G03G 21/0064; G03G 21/0035; H02M 1/0009; H02M 1/0016; H02M 1/0025; H02M 1/0003; H02M 7/04
USPC .............................. 399/37, 71, 354
See application file for complete search history.

(56) References Cited

U.S. PATENT DOCUMENTS 5,567,997 A * 10/1996 Suzuki ................ G03G 15/80
363/21.01
2006/0091916 A1    5/2006 Uchiyama et al.
(Continued)

FOREIGN PATENT DOCUMENTS

JP    2006126630 A    5/2006

*Primary Examiner* — Robert B Beatty
(74) *Attorney, Agent, or Firm* — Alleman Hall & Tuttle LLP

(57) ABSTRACT

A first voltage generation circuit outputs a first output voltage having a first polarity, of a level corresponding to a first adjustment signal, to a first output line. A first control circuit executes first feedback control for outputting the first adjustment signal to the first voltage generation circuit. A second voltage generation circuit generates a second output voltage having a second polarity, of a level corresponding to a second adjustment signal, and outputs it to a second output line. A second control circuit executes second feedback control for outputting the second adjustment signal to the second voltage generation circuit, to execute processing of causing the second voltage generation circuit to generate the second output voltage and processing of causing the second voltage generation circuit to stop outputting the second output voltage. The first control circuit executes the first feedback control at a response speed lower than the second feedback control.

5 Claims, 3 Drawing Sheets

(56) References Cited

U.S. PATENT DOCUMENTS

| | | | |
|---|---|---|---|
| 2009/0052932 A1* | 2/2009 | Sakata | G03G 15/5004 |
| | | | 399/88 |
| 2014/0212163 A1* | 7/2014 | Kawakatsu | G03G 15/5004 |
| | | | 363/21.01 |
| 2015/0268616 A1* | 9/2015 | Minobe | H02M 3/33561 |
| | | | 399/88 |
| 2017/0315495 A1* | 11/2017 | Suzuki | H02M 3/33507 |
| 2018/0196386 A1* | 7/2018 | Shiraki | G03G 15/80 |
| 2018/0316269 A1* | 11/2018 | Shimura | H02M 3/33571 |

* cited by examiner

VOLTAGE SUPPLYING DEVICE, DEVELOPER RECOVERY DEVICE, AND IMAGE FORMING APPARATUS

INCORPORATION BY REFERENCE

This application is based upon and claims the benefit of priority from the corresponding Japanese Patent Application No. 2023-205891 filed on Dec. 6, 2023, the entire contents of which are incorporated herein by reference.

BACKGROUND

The present disclosure relates to a voltage supplying device capable of supplying two types of voltages having different polarities, a developer recovery device including the voltage supplying device, and an image forming apparatus.

In an image forming apparatus that uses electrophotography, a charging device, an exposure device, and a developing device form an image of developer on a surface of an image-carrying member, and a transfer device transfers the image of the developer onto a sheet from the image-carrying member. In general, the developer is toner, and the image-carrying member is a photoconductor.

The charging device, the developing device, and the transfer device each include a high-voltage power supply device which outputs a high voltage.

For example, it is known that in the high-voltage power supply device, a pair of first voltage output lines of a first voltage generation circuit and a pair of second voltage output lines of a second voltage generation circuit are connected in series.

SUMMARY

A voltage supplying device according to an aspect of the present disclosure includes a first voltage generation circuit, a first control circuit, a second voltage generation circuit, and a second control circuit. The first voltage generation circuit generates a first output voltage having a first polarity, that is of a level corresponding to a first adjustment signal that is input, and outputs the first output voltage to a first output line using a grounded first reference line as a reference. The first control circuit executes first feedback control for outputting, to the first voltage generation circuit, the first adjustment signal corresponding to a comparison result between a level of a first target signal that is input and a level of a first feedback signal expressing the level of the first output voltage. The second voltage generation circuit generates a second output voltage having a second polarity, that is of a level corresponding to a second adjustment signal that is input, and outputs the second output voltage to a second output line using a second reference line that is electrically connected to the first output line as a reference. The second control circuit executes second feedback control for outputting, to the second voltage generation circuit, the second adjustment signal corresponding to a comparison result between a level of a second target signal that is input and a level of a second feedback signal expressing a level of a third output voltage that is generated between a grounding line and the second output line, to selectively execute processing of causing the second voltage generation circuit to generate the second output voltage having an absolute value larger than an absolute value of the first output voltage and processing of causing the second voltage generation circuit to stop outputting the second output voltage. The first control circuit executes the first feedback control at a response speed lower than that of the second feedback control. The voltage supplying device supplies the third output voltage to a voltage supplying target.

A developer recovery device according to another aspect of the present disclosure includes a rotation member and the voltage supplying device. The rotation member rotates while being in contact with a surface of an image-carrying member which rotates. The voltage supplying device selectively supplies two types of voltages having different polarities to the rotation member. The rotation member recovers developer remaining on the surface of the image-carrying member when one of the two types of voltages is supplied thereto, and releases the developer to the image-carrying member when another one of the two types of voltages is supplied thereto.

An image forming apparatus according to another aspect of the present disclosure includes an image-carrying member which rotates, an exposure device, a developing device, and the developer recovery device. The exposure device exposes a surface of the image-carrying member to form an electrostatic latent image on the surface of the image-carrying member. The developing device supplies developer to the surface of the image-carrying member to develop the electrostatic latent image.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. It is noted that the following embodiment is an example of embodying the present disclosure and does not limit the technical scope of the present disclosure.

An image forming apparatus 10 according to the embodiment is an apparatus which executes print processing using electrophotography. The print processing is processing of forming an image on a sheet 9. The sheet 9 is an image forming medium such as a paper sheet or a sheet-type resin member.

[Configuration of Image Forming Apparatus 10]

Figure 1:
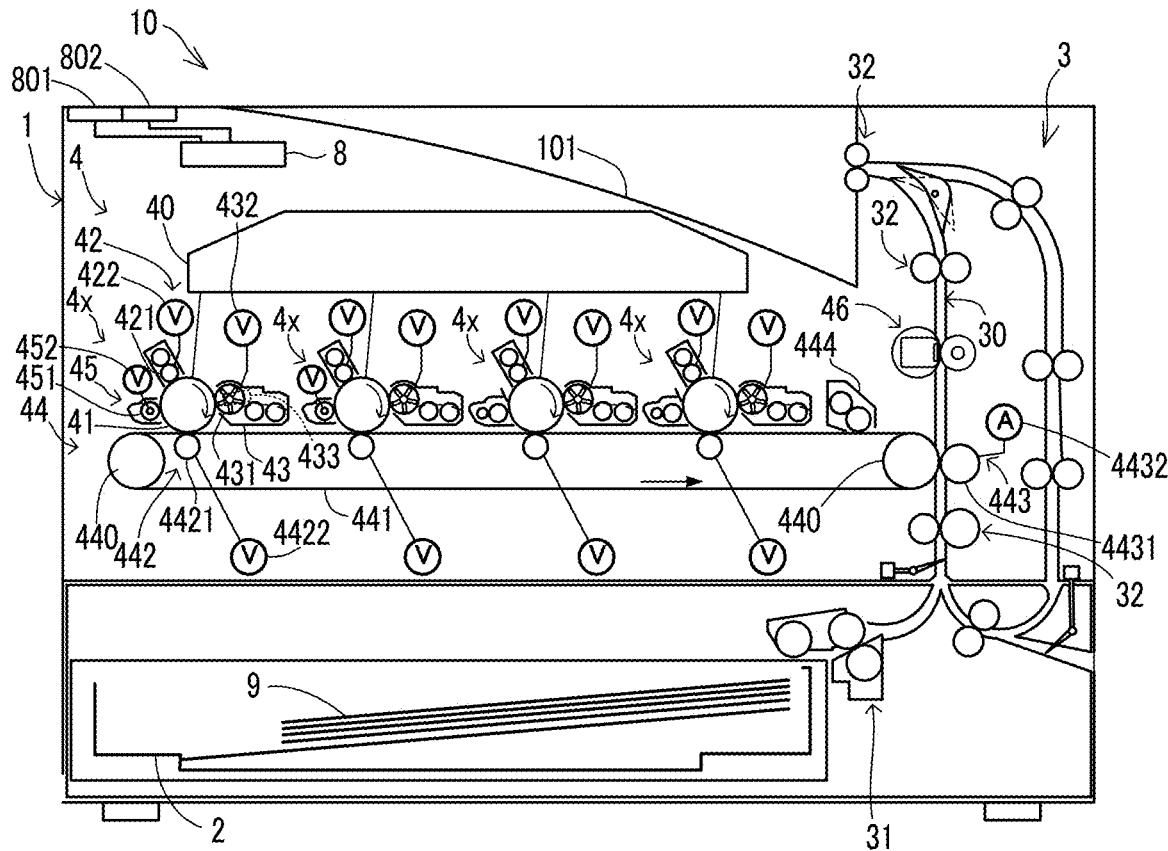
FIG. 1 is a configuration diagram of an image forming apparatus according to an embodiment.

As shown in FIG. 1, the image forming apparatus 10 includes a sheet storing portion 2, a sheet conveying path 30, a sheet conveying device 3, and a printing device 4. The image forming apparatus 10 also includes an operation device 801, a display device 802, and a control device 8.

The sheet conveying path 30, the sheet conveying device 3, the printing device 4, and the control device 8 are accommodated in a housing 1.

The sheet storing portion 2 stores sheets 9. The sheet conveying device 3 feeds the sheet 9 from the sheet storing portion 2 to the sheet conveying path 30, and further conveys the sheet 9 along the sheet conveying path 30.

The sheet conveying device 3 includes a sheet feed mechanism 31 and a plurality of conveying roller pairs 32.

The sheet feed mechanism 31 feeds the sheets 9 stored in the sheet storing portion 2 to the sheet conveying path 30. The plurality of conveying roller pairs 32 convey the sheet 9 along the sheet conveying path 30. In addition, one pair out of the plurality of conveying roller pairs 32 discharges the sheet 9 from the sheet conveying path 30 onto a discharge tray 101.

The printing device 4 executes the print processing on the sheet 9 conveyed along the sheet conveying path 30. In the present embodiment, the printing device 4 is a tandem-type color printing device.

The printing device 4 forms a toner image on the sheet 9 conveyed along the sheet conveying path 30. The toner image is an image that uses toner as developer. The toner is an example of granular developer.

The printing device 4 includes a plurality of monochromatic image forming portions 4x, a laser scanning unit 40, a transfer device 44, and a fixing device 46. In the present embodiment, the printing device 4 includes four monochromatic image forming portions 4x respectively corresponding to four colors of yellow, cyan, magenta, and black.

Each of the monochromatic image forming portions 4x includes a drum-type photoconductor 41, a charging device 42, a developing device 43, a drum cleaning device 45, and the like.

In each of the monochromatic image forming portions 4x, the photoconductor 41 rotates, and the charging device 42 executes charging processing. The charging processing is processing of charging a surface of the photoconductor 41. Further, the laser scanning unit 40 scans laser light so as to form an electrostatic latent image on the charged surface of the photoconductor 41.

The laser scanning unit 40 is an example of an exposure device which exposes the charged surface of the photoconductor 41 to form the electrostatic latent image on the surface of the photoconductor 41.

The developing device 43 supplies the toner to the surface of the photoconductor 41 to thus develop the electrostatic latent image into the toner image. The developing device 43 supplies the toner to the photoconductor 41 at a developing position on an outer circumference of the photoconductor 41. The toner image is an example of an image of the developer.

The charging device 42 includes a charging roller 421 and a charging voltage output device 422. The charging roller 421 is arranged opposed to the photoconductor 41 at a charging position on the outer circumference of the photoconductor 41. The charging voltage output device 422 supplies a charging bias voltage to the charging roller 421. The charging bias voltage is a bias voltage applied in the charging processing.

The charging bias voltage is applied to the photoconductor 41 from the charging voltage output device 422 via the charging roller 421. Thus, the surface of the photoconductor 41 is charged.

The developing device 43 includes a developing roller 431 and a developing voltage output device 432. The developing roller 431 is arranged opposed to the photoconductor 41 at the developing position. The developing roller 431 rotates while carrying toner.

The developing voltage output device 432 applies a developing bias voltage to the developing roller 431. In the present embodiment, the developing bias voltage is a voltage obtained by superimposing an AC voltage on a DC voltage.

The developing roller 431 is arranged opposed to the photoconductor 41 and rotates while carrying toner. The developing roller 431 supplies the toner to the surface of the photoconductor 41 at the developing position. The toner carried by the developing roller 431 shifts to a portion of the electrostatic latent image on the surface of the photoconductor 41 by an electric field generated between the developing roller 431 and the photoconductor 41.

At the developing position, the toner shifts from the developing roller 431 to the portion of the electrostatic latent image on the surface of the photoconductor 41. Thus, the electrostatic latent image is developed into the toner image. The photoconductors 41 are each an example of an image-carrying member which rotates while carrying the toner image.

In the present embodiment, the developing device 43 performs development using a two-component developing system. In other words, the developing device 43 causes the toner to be charged by stirring two-component developer including the toner and a magnetic carrier. In addition, the developing device 43 supplies the charged toner to the photoconductor 41.

The magnetic carrier is a granular carrier having a magnetic property. For example, the magnetic carrier is a granular magnetic body having a coated surface. The coating is formed of, for example, a synthetic resin such as an epoxy resin.

The transfer device 44 includes an intermediate transfer belt 441, four primary transfer devices 442 respectively corresponding to the four monochromatic image forming portions 4x, a secondary transfer device 443, and a belt cleaning device 444.

The intermediate transfer belt 441 is supported by a plurality of supporting rollers 440. One of the plurality of supporting rollers 440 rotates by power from a motor (not shown). Thus, the intermediate transfer belt 441 rotates.

A surface of the intermediate transfer belt 441 is in contact with the surface of each of the photoconductors 41 at a primary transfer position on the outer circumference of each of the photoconductors 41. The intermediate transfer belt 441 rotates while being in contact with the surface of each of the photoconductors 41.

Each of the primary transfer devices 442 is capable of executing primary transfer processing. The primary transfer processing is processing of transferring the toner image formed on the surface of the photoconductor 41 onto the surface of the intermediate transfer belt 441 at the primary transfer position.

By the plurality of primary transfer devices 442 executing the primary transfer processing, the toner images of a plurality of colors are formed on the surface of the intermediate transfer belt 441.

Each of the primary transfer devices 442 includes a primary transfer roller 4421 and a primary transfer voltage output device 4422. The primary transfer roller 4421 is arranged opposed to the photoconductor 41 via the intermediate transfer belt 441.

The primary transfer voltage output device 4422 applies a primary transfer voltage to the primary transfer roller 4421. The toner image formed on the surface of the photoconductor 41 is transferred onto the surface of the intermediate transfer belt 441 by an electric field generated between the photoconductor 41 and the primary transfer roller 4421. A polarity of the primary transfer voltage is a reverse polarity from a charging polarity of the toner.

The secondary transfer device 443 is capable of executing secondary transfer processing. The secondary transfer processing is processing of transferring the toner image formed on the intermediate transfer belt 441 onto the sheet 9 at a secondary transfer position on the sheet conveying path 30.

The secondary transfer device 443 includes a secondary transfer roller 4431 and a secondary transfer voltage output device 4432. The secondary transfer roller 4431 is in contact with the intermediate transfer belt 441 at the secondary transfer position. The sheet 9 passes between the intermediate transfer belt 441 and the secondary transfer roller 4431.

The secondary transfer voltage output device 4432 applies a secondary transfer voltage to the secondary transfer roller 4431. The toner image formed on the surface of the intermediate transfer belt 441 is transferred onto the sheet 9 by an electric field generated between the intermediate transfer belt 441 and the secondary transfer roller 4431. A polarity of the secondary transfer voltage is a reverse polarity from the charging polarity of the toner.

It is noted that the intermediate transfer belt 441 is an example of an intermediate transfer member.

The drum cleaning device 45 executes recovery processing. The recovery processing is processing of recovering toner remaining at a portion on the surface of the photoconductor 41 that has passed through the primary transfer position.

The belt cleaning device 444 removes toner remaining at a portion on the intermediate transfer belt 441 that has passed through the secondary transfer position.

For example, the belt cleaning device 444 scrapes the toner on the surface of the intermediate transfer belt 441 using a cleaning blade or a cleaning brush that comes into contact with the surface of the intermediate transfer belt 441.

It is noted that the belt cleaning device 444 may include a cleaning roller that comes into contact with the surface of the intermediate transfer belt 441 and a brush that comes into contact with the cleaning roller. In this case, the belt cleaning device 444 applies a cleaning voltage to the cleaning roller to thus cause the toner on the surface of the intermediate transfer belt 441 to electrically stick to a surface of the cleaning roller. The brush scrapes the toner from the surface of the cleaning roller.

The fixing device 46 heats and pressurizes the toner image on the sheet 9. Thus, the fixing device 46 fixes the toner image onto the sheet 9.

The operation device 801 is a device that accepts operations of people. For example, the operation device 801 includes operation buttons and a touch panel.

The display device 802 is a device that displays information. For example, the display device 802 includes a panel display device such as a liquid crystal display unit.

[Configuration of Control Device 8]

Figure 2:
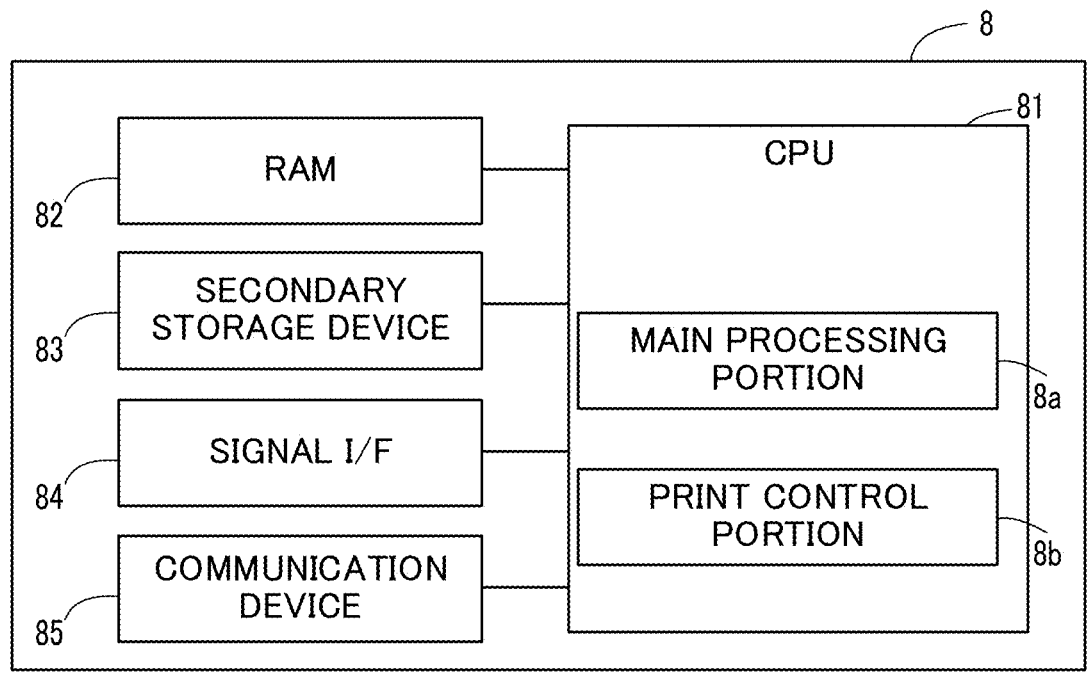
FIG. 2 is a block diagram showing a configuration of a control device in the image forming apparatus according to the embodiment.

As shown in FIG. 2, the control device 8 includes a CPU (Central Processing Unit) 81, a RAM (Random Access Memory) 82, a secondary storage device 83, a signal interface 84, a communication device 85, and the like.

The secondary storage device 83 is a nonvolatile computer-readable storage device. The secondary storage device 83 is capable of storing and updating computer programs and various types of data. For example, one or both of a flash memory and a hard disk drive is/are adopted as the secondary storage device 83.

The signal interface 84 converts signals output from various sensors into digital data, and transmits the digital data obtained by the conversion to the CPU 81. In addition, the signal interface 84 converts a control command output by the CPU 81 into a control signal, and transmits the control signal to a device to be controlled.

The communication device 85 executes communication with other apparatuses such as a host apparatus (not shown). The CPU 81 communicates with the other apparatuses via the communication device 85.

The CPU 81 is a processor which executes the computer programs to execute various types of data processing and control. The control device 8 including the CPU 81 controls the sheet conveying device 3, the printing device 4, the display device 802, the communication device 85, and the like.

The RAM 82 is a volatile computer-readable storage device. The RAM 82 primarily stores the computer programs to be executed by the CPU 81 and data to be output and referenced by the CPU 81 during a process of executing various types of processing.

The CPU 81 includes a plurality of processing modules that are realized by executing the computer programs. The plurality of processing modules include a main processing portion 8a, a print control portion 8b, and the like.

The main processing portion 8a executes processing of causing various types of processing to be started in response to operations made with respect to the operation device 801, control of the display device 802, and the like.

The print control portion 8b controls the sheet conveying device 3. Thus, the print control portion 8b controls the feed of the sheet 9 from the sheet storing portion 2 and the conveyance of the sheet 9 on the sheet conveying path 30.

Further, the print control portion 8b controls the printing device 4. The print control portion 8b causes the printing device 4 to execute the print processing in sync with the conveyance of the sheet 9 by the sheet conveying device 3.

In addition, when causing the printing device 4 to execute the print processing, the print control portion 8b causes the drum cleaning device 45 to execute the recovery processing.

Incidentally, the drum cleaning device 45 includes a recovery member 451 and a voltage supplying device 452 for executing the recovery processing (see FIG. 1).

The recovery member 451 rotates while being in contact with the surface of the photoconductor 41. The recovery member 451 is an example of a rotation member. The voltage supplying device 452 supplies a recovery voltage to the recovery member 451. The recovery voltage is a voltage having a polarity different from the charging polarity of the toner.

The recovery member 451 is a member capable of retaining the toner. For example, the recovery member 451 is a porous member such as a sponge.

The drum cleaning device 45 supplies the recovery voltage to the recovery member 451 to execute the recovery processing.

The drum cleaning device 45 also executes release processing for releasing the recovered toner to the surface of the photoconductor 41.

The drum cleaning device 45 supplies a release voltage having a polarity that is the same as the charging polarity of the toner to the recovery member 451, to thus execute the release processing. The toner released to the surface of the photoconductor 41 is recovered by another device.

For example, when the charging polarity of the toner is a positive polarity, the recovery voltage is a voltage having a negative polarity, and the release voltage is a voltage having a positive polarity.

The voltage supplying device 452 is capable of selectively supplying the recovery voltage and the release voltage to the recovery member 451. The drum cleaning device 45 is an example of a developer recovery device.

In descriptions below, toner remaining at a portion on the surface of the photoconductor 41 that has passed through the primary transfer position will be referred to as residual toner. Moreover, toner released to the surface of the photoconductor 41 by the release processing will be referred to as release toner.

The recovery member 451 is in contact with the surface of the photoconductor 41 at a recovery position on the outer circumference of the photoconductor 41. The recovery position is a position between the primary transfer position and the charging position on the outer circumference of the photoconductor 41.

The drum cleaning device 45 applies the recovery voltage or the release voltage to the recovery member 451 to selectively execute one of the recovery processing and the release processing.

The voltage supplying device 452 applies the recovery voltage to the recovery member 451 in the recovery processing. Thus, the voltage supplying device 452 electrically draws the residual toner to the recovery member 451. The recovery member 451 retains the drawn toner.

Specifically, the voltage supplying device 452 applies the recovery voltage to the recovery member 451 to recover the residual toner in the recovery member 451. The toner recovered by the recovery member 451 is accumulated in a plurality of holes formed on a surface of the recovery member 451.

Meanwhile, the voltage supplying device 452 applies the release voltage to the recovery member 451 in the release processing. Thus, the toner recovered by the recovery member 451 electrically repels the recovery member 451 to thus be released from the recovery member 451 to the surface of the photoconductor 41.

When the print processing is executed, the drum cleaning device 45 executes the recovery processing. By executing the recovery processing, the toner that has not been transferred onto the intermediate transfer belt 441 at the primary transfer position is recovered by the recovery member 451.

However, since the toner is accumulated in the recovery member 451, toner recovery performance of the recovery member 451 is lowered.

Meanwhile, the release processing is executed when a predetermined release condition is satisfied under a situation where the print processing is not executed. By executing the release processing, the toner recovery performance of the recovery member 451 is improved.

In the present embodiment, when the release processing is executed, the primary transfer voltage output device 4422 transfers the release toner from the photoconductor 41 onto the intermediate transfer belt 441, and the secondary transfer device 443 does not transfer the release toner on the intermediate transfer belt 441 onto the sheet 9.

Specifically, when the release processing is executed, the primary transfer voltage output device 4422 applies the primary transfer voltage to the primary transfer roller 4421, and the secondary transfer voltage output device 4432 applies a non-transfer voltage having a polarity different from that of the secondary transfer voltage to the secondary transfer roller 4431.

The secondary transfer voltage output device 4432 is capable of outputting the secondary transfer voltage or the non-transfer voltage to the secondary transfer roller 4431.

When the release processing is executed, the belt cleaning device 444 removes the release toner from the surface of the intermediate transfer belt 441.

The print control portion 8*b* determines whether or not the release condition is satisfied under the situation where the print processing is not executed.

For example, the release condition is a condition that is satisfied every time the number of times of page printing reaches a predetermined number of times. The page printing is the print processing with respect to one page of the sheets 9.

In addition, when determining that the release condition is satisfied, the print control portion 8*b* executes reproduction control.

In the reproduction control, the print control portion 8*b* causes the drum cleaning device 45 to execute the release processing.

Further, in the reproduction control, the print control portion 8*b* does not cause the charging voltage output device 422 to output a voltage and does not cause the laser scanning unit 40 to form the electrostatic latent image.

Furthermore, in the reproduction control, the print control portion 8*b* causes the primary transfer voltage output device 4422 to output the primary transfer voltage and causes the secondary transfer voltage output device 4432 to output the non-transfer voltage. Thus, the belt cleaning device 444 removes the release toner from the surface of the intermediate transfer belt 441.

In the voltage supplying device 452 of the drum cleaning device 45, two voltage generation circuits for generating the recovery voltage and the release voltage may be adopted.

It is desirable for the voltage supplying device 452 of the drum cleaning device 45 to be capable of stably supplying two types of voltages having different polarities to the recovery member 451. The two types of voltages are the recovery voltage and the release voltage.

[Voltage Supplying Device 452]

Figure 3:
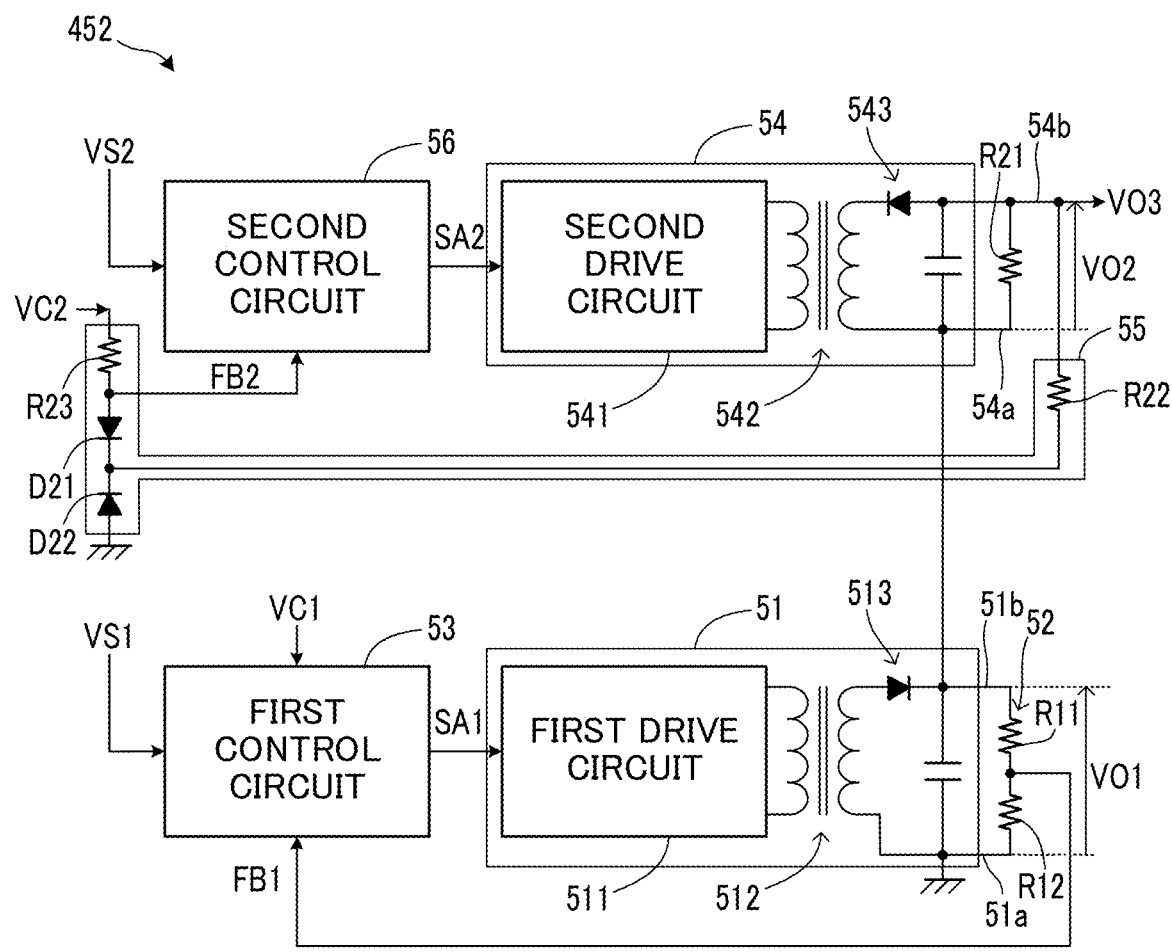
FIG. 3 is a configuration diagram of a recovery voltage output device in the image forming apparatus according to the embodiment.

Hereinafter, a configuration of the voltage supplying device 452 will be described with reference to FIG. 3. The voltage supplying device 452 has a configuration for stably outputting the two types of voltages. FIG. 3 shows an example of a case where the charging polarity of the toner is a positive polarity.

The voltage supplying device 452 includes a first voltage generation circuit 51, a first output level detection circuit 52, a first control circuit 53, a second voltage generation circuit 54, a second output level detection circuit 55, and a second control circuit 56.

The first voltage generation circuit 51 generates a first output voltage VO1 having a first polarity, that is of a level corresponding to a first adjustment signal SA1 that is input. The first voltage generation circuit 51 adjusts the level of the first output voltage VO1 according to the level of the first adjustment signal SA1. The first voltage generation circuit 51 outputs the first output voltage VO1 to a first output line 51*b* using a grounded first reference line 51*a* as a reference.

The first reference line 51*a* and the first output line 51*b* are a pair of voltage output lines of the first voltage generation circuit 51.

In the present embodiment, the first voltage generation circuit 51 includes a first drive circuit 511, a first transformer 512, and a first rectification circuit 513.

The first drive circuit 511 outputs a first AC voltage corresponding to the level of the first adjustment signal SA1 to the first transformer 512.

The first transformer 512 amplifies the first AC voltage supplied from the first drive circuit 511. The first rectification circuit 513 rectifies the first AC voltage amplified by the first transformer 512 to generate the first output voltage VO1 that is a DC voltage. The generated first output voltage VO1 is output to the first reference line 51a and the first output line 51b.

In the example shown in FIG. 3, the first rectification circuit 513 outputs the first output voltage VO1 having the positive polarity to the first output line 51b using the grounded first reference line 51a as a reference.

The first output voltage VO1 is a voltage having the same polarity as the charging polarity of the toner. The first output voltage VO1 is the release voltage output to the recovery member 451 when the release processing is executed. The first adjustment signal SA1 is supplied from the first control circuit 53 to the first drive circuit 511.

The first output level detection circuit 52 detects the level of the first output voltage VO1 and outputs a first feedback signal FB1 expressing the level of the first output voltage VO1 to the first control circuit 53. The first feedback signal FB1 is an example of a signal expressing the level of the first output voltage VO1.

In the present embodiment, the first output level detection circuit 52 is a voltage-dividing circuit which includes a first resistance element R11 and a second resistance element R12 connected in series and divides the first output voltage VO1. A voltage level of the first feedback signal FB1 is a level of a voltage obtained by dividing the first output voltage VO1 by the first resistance element R11 and the second resistance element R12.

Accordingly, the voltage level of the first feedback signal FB1 is proportional to the level of the first output voltage VO1. A proportionality coefficient of the voltage level of the first feedback signal FB1 with respect to the level of the first output voltage VO1 is determined by resistance values of the first resistance element R11 and the second resistance element R12.

The first control circuit 53 is a circuit which executes first feedback control. In the first feedback control, the first control circuit 53 outputs, to the first voltage generation circuit 51, the first adjustment signal SA1 corresponding to a comparison result between a level of a first reference voltage VS1 that is input and the level of the first feedback signal FB1.

When the level of the first feedback signal FB1 is lower than the level of the first reference voltage VS1, the first control circuit 53 adjusts the level of the first adjustment signal SA1 so as to be set to a higher level. On the other hand, when the level of the first feedback signal FB1 is higher than the level of the first reference voltage VS1, the first control circuit 53 adjusts the level of the first adjustment signal SA1 so as to be set to a lower level.

By executing the first feedback control, the level of the first output voltage VO1 is adjusted to a first target level by the first voltage generation circuit 51. In the present embodiment, the first target level is a target level of the release voltage. The first reference voltage VS1 is an example of a first target signal.

It is noted that the first control circuit 53 selectively executes first feedback processing and first stop processing according to a level of a first control voltage VC1 supplied from the CPU 81. The first feedback processing is processing of executing the first feedback control to thus cause the first voltage generation circuit 51 to generate the first output voltage VO1. The first stop processing is processing of causing the first voltage generation circuit 51 to stop outputting the first output voltage VO1.

The second voltage generation circuit 54 generates a second output voltage VO2 having a second polarity, that is of a level corresponding to a second adjustment signal SA2 that is input. The second voltage generation circuit 54 adjusts the level of the second output voltage VO2 according to the level of the second adjustment signal SA2. The second voltage generation circuit 54 outputs the second output voltage VO2 to a second output line 54b using a second reference line 54a as a reference. The second reference line 54a is electrically connected to the first output line 51b. Specifically, the second reference line 54a is short-circuited with the first output line 51b.

In the present embodiment, the second voltage generation circuit 54 includes a second drive circuit 541, a second transformer 542, a second rectification circuit 543, and a bleeder resistance element R21.

The second drive circuit 541 outputs a second AC voltage corresponding to the level of the second adjustment signal SA2 to the second transformer 542.

The second transformer 542 amplifies the second AC voltage supplied from the second drive circuit 541. The second rectification circuit 543 rectifies the second AC voltage amplified by the second transformer 542 to generate the second output voltage VO2 that is a DC voltage. The generated second output voltage VO2 is output to the second reference line 54a and the second output line 54b.

In the example shown in FIG. 3, the second rectification circuit 543 outputs the second output voltage VO2 having the negative polarity to the second output line 54b using the second reference line 54a as a reference. The bleeder resistance element R21 is connected to the second reference line 54a and the second output line 54b.

The second reference line 54a and the second output line 54b are a pair of voltage output lines of the second voltage generation circuit 54. The recovery member 451 is electrically connected to the second output line 54b and a grounding line.

Specifically, the voltage supplying device 452 supplies a third output voltage VO3 generated between the grounding line and the second output line 54b to the recovery member 451. The recovery member 451 is an example of a voltage supplying target to which the voltage is supplied by the voltage supplying device 452.

The second output voltage VO2 is a voltage having a polarity different from the charging polarity of the toner. The second output voltage VO2 is the recovery voltage that is output to the recovery member 451 when the recovery processing is executed. The second adjustment signal SA2 is supplied from the second control circuit 56 to the second drive circuit 541.

The second output level detection circuit 55 detects the level of the second output voltage VO2 and outputs a second feedback signal FB2 expressing the level of the second output voltage VO2 to the second control circuit 56. The second feedback signal FB2 is an example of a signal expressing the level of the second output voltage VO2.

In the present embodiment, the second output level detection circuit 55 includes a third resistance element R22, a first diode D21, a fourth resistance element R23, and a second diode D22. The third resistance element R22 is connected to the second output line 54b.

The third resistance element R22, the first diode D21, and the fourth resistance element R23 are connected in series, and the third resistance element R22 and the second diode D22 are connected in series.

The first diode D21 is connected to the third resistance element R22 and the fourth resistance element R23, and the fourth resistance element R23 is connected to the first diode D21 and a supply line of a second control voltage VC2. The second diode D22 is connected to the third resistance element R22 and a grounding line.

The first diode D21 inhibits a current that flows from the second output line 54b toward a side of the supply line of the second control voltage VC2. The second diode D22 inhibits the current that flows toward the grounding line when the second control voltage VC2 drops in a state where the third output voltage VO3 having the negative polarity is output from the second output line 54b, to thus prevent the polarity of the second feedback signal FB2 from becoming the negative polarity.

The voltage of the line between the fourth resistance element R23 and the first diode D21 is input to the second control circuit 56 as the second feedback signal FB2. In addition, a second reference voltage VS2 is input to the second control circuit 56.

Herein, a voltage obtained by adding the third output voltage VO3 and a forward voltage VD1 of the first diode D21 will be referred to as a feedback voltage. The level of the second feedback signal FB2 is a level of a voltage obtained by weighted averaging the second control voltage VC2 and the feedback voltage by a voltage-dividing ratio of the third resistance element R22 and the fourth resistance element R23.

Accordingly, under a situation where the second control voltage VC2 is constant, the level of the second feedback signal FB2 has a positive correlation with the level of the third output voltage VO3. The second feedback signal FB2 is an example of a signal expressing the level of the third output voltage VO3.

The second control circuit 56 is a circuit which executes second feedback control. In the second feedback control, the second control circuit 56 outputs, to the second voltage generation circuit 54, the second adjustment signal SA2 corresponding to a comparison result between a level of a second reference voltage VS2 that is input and the level of the second feedback signal FB2.

When the level of the second feedback signal FB2 is lower than the level of the second reference voltage VS2, the second control circuit 56 adjusts the level of the second adjustment signal SA2 so as to be set to a higher level. On the other hand, when the level of the second feedback signal FB2 is higher than the level of the second reference voltage VS2, the second control circuit 56 adjusts the level of the second adjustment signal SA2 so as to be set to a lower level.

By executing the second feedback control, the level of the third output voltage VO3 is adjusted to a second target level by the second voltage generation circuit 54. In the present embodiment, the second target level is a target level of the recovery voltage having the negative polarity. The second reference voltage VS2 is an example of a second target signal.

When the first feedback control and the second feedback control are being executed, an absolute value of the second output voltage VO2 is larger than an absolute value of the first output voltage VO1. Thus, the third output voltage VO3 having the negative polarity is supplied to the recovery member 451.

Meanwhile, when the voltage output by the second voltage generation circuit 54 is stopped, the level of the second output voltage VO2 is 0. Accordingly, when the first feedback control is executed and the output of the second output voltage VO2 by the second voltage generation circuit 54 is stopped, the third output voltage VO3 having the positive polarity is supplied to the recovery member 451.

The second control circuit 56 selectively executes second feedback processing and second stop processing according to the level of the second control voltage VC2 supplied from the CPU 81. The second feedback processing is processing of executing the second feedback control to thus cause the second voltage generation circuit 54 to generate the second output voltage VO2. The second stop processing is processing of causing the second voltage generation circuit 54 to stop outputting the second output voltage VO2.

In the present embodiment, when the second control voltage VC2 is larger than the second reference voltage VS2, the second voltage generation circuit 54 outputs the second output voltage VO2 of a level determined by Expression (1). Expression (1) is an expression that expresses that the second output voltage VO2 is determined based on the second control voltage VC2, the second reference voltage VS2, a resistance value R1 of the bleeder resistance element R21, a resistance value R2 of the third resistance element R22, a resistance value R3 of the fourth resistance element R23, and the forward voltage VD1 of the first diode D21.

$$VO2 = -\frac{R2}{R3}(VC2 - VS2) + VS2 - VD1 - VO1 \qquad (1)$$

Specifically, the second control circuit 56 executes the second feedback processing when the second control voltage VC2 larger than the second reference voltage VS2 is supplied.

When the first feedback control and the second feedback control are executed, the third output voltage VO3 having the negative polarity, that is determined by Expression (2), is supplied to the recovery member 451.

$$VO3 = -\frac{R2}{R3}(VC2 - VS2) + VS2 - VD1 \qquad (2)$$

Meanwhile, when the second control voltage VC2 is smaller than the second reference voltage VS2, a state where the level of the second feedback signal FB2 falls below the level of the second reference voltage VS2 is maintained. In this case, the second control circuit 56 lowers the level of the second adjustment signal SA2 to 0 to thus stop the voltage output by the second voltage generation circuit 54.

Specifically, the second control circuit 56 executes the second stop processing when the second control voltage VC2 smaller than the second reference voltage VS2 is supplied.

When the first feedback control is executed and the voltage output by the second voltage generation circuit 54 is stopped, the third output voltage VO3 having the positive polarity, that is determined by Expression (3), is supplied to the recovery member 451. Expression (3) shows that the third output voltage VO3 is a voltage of a level corresponding to the first output voltage VO1, the resistance value R1 of the bleeder resistance element R21, and a load current I1 that flows in the recovery member 451.

$$VO3 = VO1 - R1 \cdot I1 \quad (3)$$

Expression (3) shows that the third output voltage VO3 of a level equivalent to that of the first output voltage VO1 is supplied to the recovery member 451.

In addition, Expression (3) shows that when the voltage output by the second voltage generation circuit 54 is stopped, the third output voltage VO3 is affected by the load. On the other hand, Expression (2) shows that when the second output voltage VO2 is output from the second voltage generation circuit 54, the third output voltage VO3 is not affected by the load.

When the recovery processing is executed, the print control portion 8b executes recovery control. In the recovery control, the print control portion 8b outputs the first control voltage VC1 of a predetermined level to the first control circuit 53 and also outputs the second control voltage VC2 larger than the second reference voltage VS2 to the second control circuit 56. In the present embodiment, the print control portion 8b outputs the second control voltage VC2 to the second control circuit 56 via the fourth resistance element R23.

The second voltage generation circuit 54 executes a voltage output operation when the recovery processing is executed.

By executing the recovery control, the third output voltage VO3 having the negative polarity is output to the recovery member 451 as the recovery voltage. At this time, the third output voltage VO3 of the level determined by Expression (2) is supplied to the recovery member 451 as the recovery voltage.

As shown in Expression (2), the third output voltage VO3 output in the recovery processing is not affected by the load.

However, when a voltage output state by the first voltage generation circuit 51 fluctuates under a situation where the second voltage generation circuit 54 is operating, there is a fear that the second output voltage VO2 will largely fluctuate.

In the voltage supplying device 452, the first control circuit 53 executes the first feedback control at a response speed lower than that of the second feedback control by the second control circuit 56. This is synonymous with executing the second feedback control at a response speed higher than that of the first feedback control by the first control circuit 53.

In other words, the sensitivity of the first feedback control by the first control circuit 53 is lower than the sensitivity of the second feedback control by the second control circuit 56. This is synonymous with the sensitivity of the second feedback control by the second control circuit 56 being higher than the sensitivity of the first feedback control by the first control circuit 53. Thus, since the fluctuation speed of the voltage output state by the first voltage generation circuit 51 is alleviated and convergence of the voltage fluctuation by the second voltage generation circuit 54 is accelerated, the fluctuation of the third output voltage VO3 is suppressed.

For example, a changing speed of the first control voltage VC1 is lower than a changing speed of the second control voltage VC2. Thus, the first feedback control is executed at a response speed lower than that of the second feedback control.

Further, a time constant of an output circuit of the first adjustment signal SA1 in the first control circuit 53 may be set to be larger than a time constant of an output circuit of the second adjustment signal SA2 in the second control circuit 56.

By the third output voltage VO3 shown in Expression (2) being output to the recovery member 451 as the recovery voltage, the recovery voltage is stabilized irrespective of the condition of the load.

Meanwhile, when the release processing is executed, the print control portion 8b executes release control. In the release control, the print control portion 8b outputs the first control voltage VC1 of a predetermined level to the first control circuit 53 and also outputs the second control voltage VC2 smaller than the second reference voltage VS2 to the second control circuit 56. Specifically, the second voltage generation circuit 54 stops the voltage output operation when the release processing is executed.

In the present embodiment, the print control portion 8b outputs the second control voltage VC2 to the second control circuit 56 via the fourth resistance element R23.

By executing the release control, the third output voltage VO3 of the level equivalent to that of the first output voltage VO1 having the positive polarity is output to the recovery member 451 as the release voltage. At this time, the third output voltage VO3 of the level determined by Expression (3) is supplied to the recovery member 451 as the release voltage.

As shown in Expression (3), the third output voltage VO3 output in the release processing is affected by the load. However, in the release processing, a certain amount of fluctuations of the voltage that is output to the recovery member 451 is unproblematic.

First Modified Example

Next, a first modified example of the image forming apparatus 10 will be described with reference to FIG. 4.

In the present modified example, the charging polarity of the toner is a negative polarity. FIG. 4 shows a configuration of a recovery voltage output device 452X adopted in the present application example. The recovery voltage output device 452X is adopted in place of the voltage supplying device 452 in the image forming apparatus 10.

Figure 4:
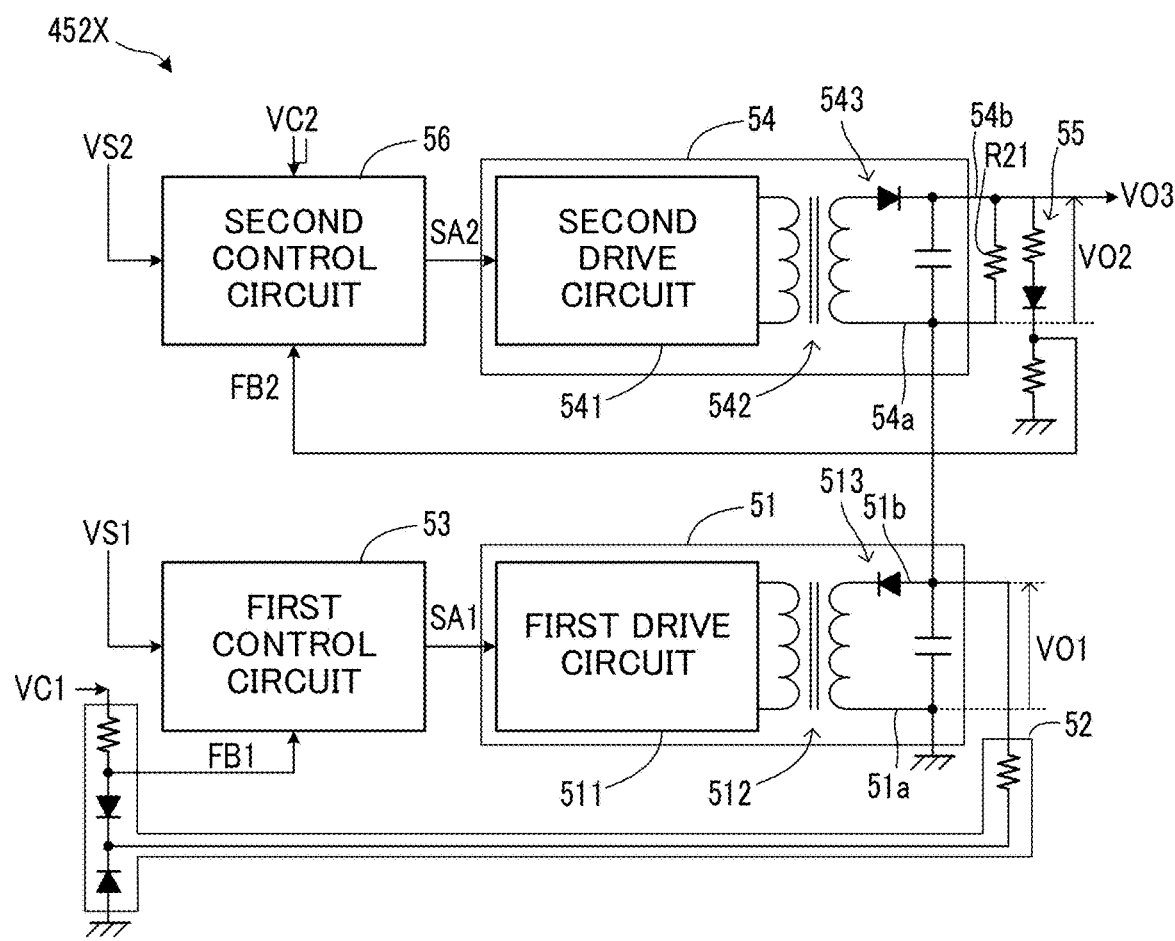
FIG. 4 is a configuration diagram of a recovery voltage output device in an image forming apparatus according to a first modified example.

In FIG. 4, constituent elements corresponding to the constituent elements shown in FIG. 3 are denoted by the same reference symbols.

In the recovery voltage output device 452X, the first voltage generation circuit 51 generates the first output voltage VO1 having the negative polarity, and the second voltage generation circuit 54 generates the second output voltage VO2 having the positive polarity. Also when the recovery voltage output device 452X is adopted, effects similar to those obtained when the voltage supplying device 452 is adopted can be obtained.

Second Modified Example

Next, a second modified example of the image forming apparatus 10 will be described.

In the image forming apparatus 10, the belt cleaning device 444 recovers the release toner.

On the other hand, in the present modified example, the developing device 43 recovers the release toner.

In the present modified example, the developing voltage output device 432 is also capable of applying a drawing bias voltage to the developing roller 431. The drawing bias voltage is a voltage different from the developing bias voltage that is applied to the developing roller 431 when developing the electrostatic latent image. The drawing bias voltage is a voltage having a polarity different from the charging polarity of the toner.

When the release processing is executed, the developing voltage output device 432 applies the drawing bias voltage to the developing roller 431. Thus, the developing device 43 recovers the release toner released from the recovery member 451 to the surface of the photoconductor 41 by the developing roller 431.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A voltage supplying device, comprising:
 a first voltage generation circuit which generates a first output voltage having a first polarity, that is of a level corresponding to a first adjustment signal that is input, and outputs the first output voltage to a first output line using a grounded first reference line as a reference;
 a first control circuit which executes first feedback control for outputting, to the first voltage generation circuit, the first adjustment signal corresponding to a comparison result between a level of a first target signal that is input and a level of a first feedback signal expressing the level of the first output voltage;
 a second voltage generation circuit which generates a second output voltage having a second polarity, that is of a level corresponding to a second adjustment signal that is input, and outputs the second output voltage to a second output line using a second reference line that is electrically connected to the first output line as a reference; and
 a second control circuit which executes second feedback control for outputting, to the second voltage generation circuit, the second adjustment signal corresponding to a comparison result between a level of a second target signal that is input and a level of a second feedback signal expressing a level of a third output voltage that is generated between a grounding line and the second output line, to selectively execute processing of causing the second voltage generation circuit to generate the second output voltage having an absolute value larger than an absolute value of the first output voltage and processing of causing the second voltage generation circuit to stop outputting the second output voltage, wherein
 the first control circuit executes the first feedback control at a response speed lower than that of the second feedback control, and
 the voltage supplying device supplies the third output voltage to a voltage supplying target.

2. A developer recovery device, comprising:
 a rotation member which rotates while being in contact with a surface of an image-carrying member which rotates; and
 the voltage supplying device according to claim 1 which selectively supplies two types of voltages having different polarities to the rotation member, wherein
 the rotation member recovers developer remaining on the surface of the image-carrying member when one of the two types of voltages is supplied thereto, and releases the developer to the image-carrying member when another one of the two types of voltages is supplied thereto.

3. An image forming apparatus, comprising:
 an image-carrying member which rotates;
 an exposure device which exposes a surface of the image-carrying member to form an electrostatic latent image on the surface of the image-carrying member;
 a developing device which supplies developer to the surface of the image-carrying member to develop the electrostatic latent image; and
 the developer recovery device according to claim 2.

4. The image forming apparatus according to claim 3, further comprising:
 an intermediate transfer member which rotates while being in contact with the surface of the image-carrying member;
 a primary transfer device which transfers an image of the developer formed on the surface of the image-carrying member onto a surface of the intermediate transfer member;
 a secondary transfer device which transfers the image of the developer transferred onto the surface of the intermediate transfer member onto a sheet; and
 a cleaning device which removes the developer remaining on the surface of the intermediate transfer member, wherein
 when the developer recovery device releases the developer from the rotation member to the image-carrying member, the primary transfer device transfers the developer released to the image-carrying member onto the intermediate transfer member, the secondary transfer device does not transfer the developer transferred onto the intermediate transfer member onto the sheet, and the cleaning device removes the developer transferred onto the intermediate transfer member.

5. The image forming apparatus according to claim 3, wherein
 the developing device includes a developing roller which is arranged opposed to the image-carrying member and rotates while carrying the developer, and
 when the developer recovery device releases the developer from the rotation member to the image-carrying member, the developing device applies, to the developing roller, a voltage different from a developing bias voltage that is applied to the developing roller at a time of developing the electrostatic latent image, to recover the developer released to the image-carrying member.

* * * * *